United States Patent
Ferrentino

(10) Patent No.: US 9,967,198 B2
(45) Date of Patent: May 8, 2018

(54) SYSTEM AND METHOD FOR MINIMIZING DATA LOSS IN A NETWORK

(71) Applicant: SoftNAS Operating Inc., Houston, TX (US)

(72) Inventor: Pasqualino Ferrentino, Asti AT (IT)

(73) Assignee: SoftNAS Operating Inc., Houston, TX (US)

( * ) Notice: Subject to any disclaimer, the term of this patent is extended or adjusted under 35 U.S.C. 154(b) by 0 days. days.

(21) Appl. No.: 15/821,638

(22) Filed: Nov. 22, 2017

(65) Prior Publication Data
US 2018/0097737 A1    Apr. 5, 2018

Related U.S. Application Data

(63) Continuation of application No. 15/249,104, filed on Aug. 26, 2016.

(60) Provisional application No. 62/211,401, filed on Aug. 28, 2015.

(51) Int. Cl.
| | |
|---|---|
| H04L 12/28 | (2006.01) |
| H04L 12/853 | (2013.01) |
| H04L 12/825 | (2013.01) |
| H04L 12/931 | (2013.01) |
| H04L 12/26 | (2006.01) |

(52) U.S. Cl.
CPC ......... *H04L 47/2416* (2013.01); *H04L 47/25* (2013.01); *H04L 49/206* (2013.01); *H04L 43/0829* (2013.01)

(58) Field of Classification Search
CPC ......... H04L 43/00; H04L 43/12; H04L 43/14; H04L 43/50
See application file for complete search history.

(56) References Cited

U.S. PATENT DOCUMENTS

| | | | | |
|---|---|---|---|---|
| 7,990,887 | B2 * | 8/2011 | Cidon | H04L 43/50 370/238 |
| 9,548,936 | B2 * | 1/2017 | Lee | H04L 47/28 |
| 2005/0058083 | A1 * | 3/2005 | Rogers | H04L 12/5601 370/252 |
| 2005/0220180 | A1 * | 10/2005 | Barlev | H04L 12/2856 375/222 |
| 2008/0285467 | A1 * | 11/2008 | Olgaard | H04B 17/0085 370/242 |

* cited by examiner

Primary Examiner — Kevin C Harper
(74) Attorney, Agent, or Firm — Polsinelli PC

(57) ABSTRACT

Disclosed are systems and methods for an optimal transmission rate for large quantities of data over a network using gambler strategies. The gambler strategies can include initiating a gambler of a generation including a plurality of gamblers and transmitting one or more packets for the gambler over a network at a transmission rate specified by the gambler. In response to a determination the gambler is finished the network to discharge. In response to a determination the generation is finished, determining a gain-loss of the generation and the plurality of gamblers can be adjusted to be inline with an inherent network data loss rate.

21 Claims, 6 Drawing Sheets

SYSTEM AND METHOD FOR MINIMIZING DATA LOSS IN A NETWORK

CROSS-REFERENCE

This application is a continuation of U.S. Non-provisional application Ser. No. 15/249,104, filed Aug. 26, 2016 and entitled, "SYSTEM AND METHOD FOR MINIMIZING DATA LOSS IN A NETWORK", which claims benefit of U.S. Provisional Application Ser. No. 62/211,401 filed Aug. 28, 2015 and entitled "SYSTEM AND METHOD FOR MINIMIZING DATA LOSS IN A NETWORK," which is hereby incorporated by reference.

TECHNICAL FIELD

The present disclosure generally relates to data transmission across networks, and specifically to a system and method for minimizing data loss across networks.

BACKGROUND

A given network may be inherently lossy (i.e., prone to lose data in some degree). That is, some amount of data transmitted over the lossy network can be expected to be lost. Another possible reason for losing data over the lossy network can be that network utilization exceeds the available capacity of the network and causes the network's underlying queues (temporary data storage locations) to be completely full, packets of data will be dropped, because they cannot be placed into an empty slot or queue. The transmission rate utilized by network elements (i.e., servers, etc.) can contribute to exceeding network capacities.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DETAILED DESCRIPTION

Figure 1:
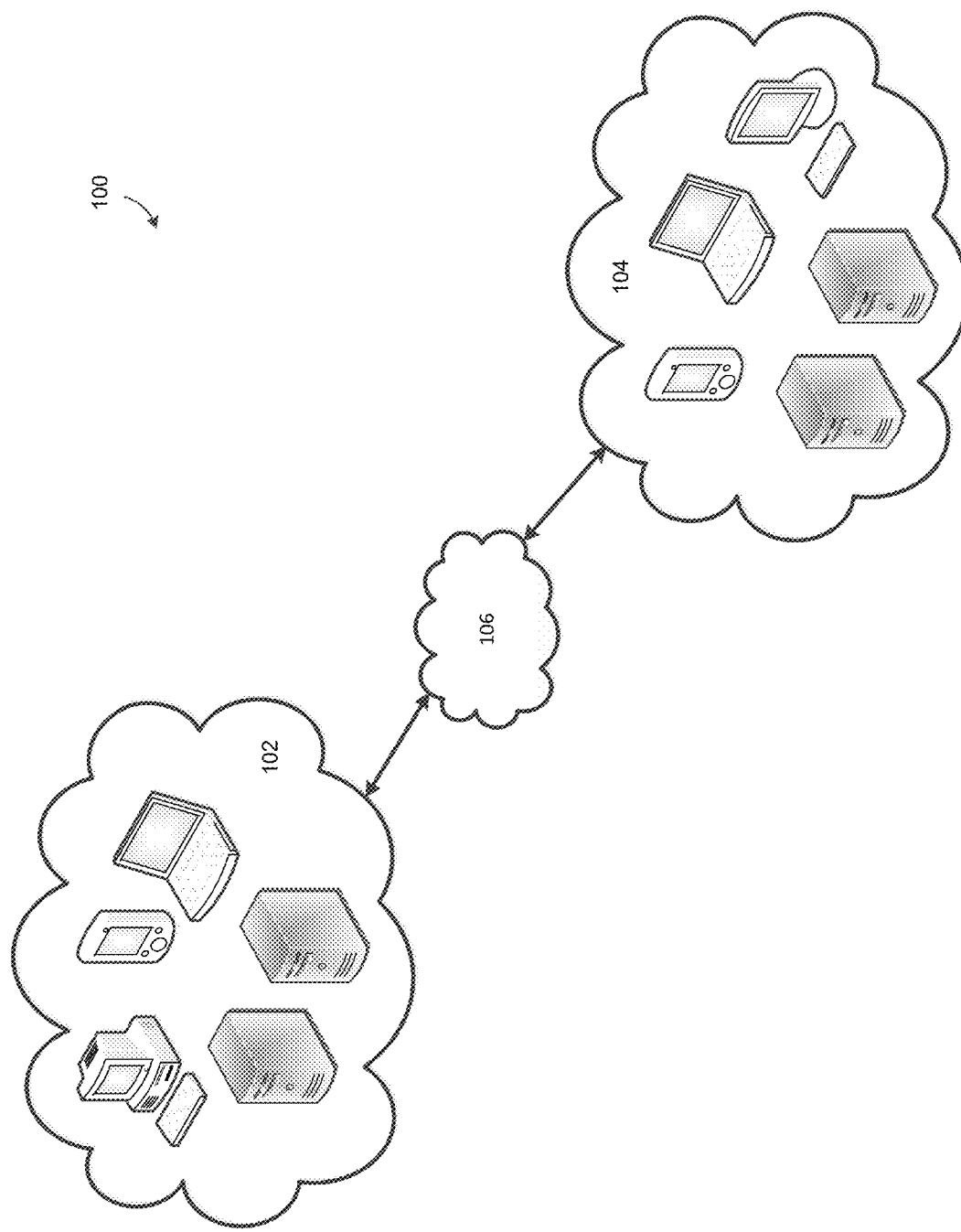
FIG. 1 is a block diagram illustrating an example data transmission network.

Reference will now be made in detail to examples, which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the examples.

The terminology used in the description of the disclosure herein is for the purpose of describing particular examples only and is not intended to be limiting of the disclosure. As used in the description of the disclosure and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In a data transmission system, data may be transmitted at a fixed rate by sending individual packets of data (or datagrams) with a given inter-packet spacing (i.e., delay between beginning of sending each packet and the next packet). As noted above, a network may be inherently lossy due to the nature of the transmission medium or may experience congestion caused by other data transmitters consuming portions of network resources.

When network utilization exceeds the available capacity of the network and the network's underlying queues are filled to capacity, the networking equipment can drop packets that are unable to be placed in an empty queue slot, and data will be lost. One way to minimize data loss would be to reduce the rate at which data is transmitted (i.e., transmission rate). It is, however, important that data be transmitted quickly (especially when large quantities of data are to be transmitted). Methods and systems within this disclosure are directed to transmitting at the fastest rate possible without causing packets to be dropped because the capacity of queues is being exceeded. One way to enable the maximum transmission rate of data without data being so dropped is to discriminate between loss that is inherently caused by the network medium or other data transmitters and loss that is caused by excess data transmission.

One method of differentiating between the two types of data loss referenced above is as follows: Data packets are transmitted over a network at a predetermined rate (determined from preexisting data etc.). Over a set interval, the inter-packet spacing delay before and/or after a data packet is transmitted is increased. Such a packet can be termed a loss probe packet. Given that the time between the transmission of one or more loss probe packets is increased, (in other words they are sent with slightly less congestion pressure from a data transmitter), a loss probe packet has a higher statistical chance of reaching its destination than other packets sent at the earlier rate. After a statistically significant number of loss probe packets (and other normal data packets) have been transmitted, the statistical success rate of the normal data packets is compared to the success rate of the loss probe packets to determine if there is a meaningful difference (i.e., statistically) between the two. If less data is lost when sent at the lower transmission rate, it can be an indication that data packets are being dropped because data is being sent to quickly (i.e., queues are being completely filled). If there is a significantly elevated success rate in loss probe packets then the data transmitter can determine that it is causing loss in the network and adjust its normal inter-packet spacing delay to a higher value to avoid causing excessive retransmission. It will be understood that what constitutes a 'significantly' elevated success rate will be guided by the level of precision considered appropriate by a person skilled in the art in a given circumstance.

Due to the fact that networks are fast changing mediums a pure, sequential approach is not optimal and would be slow and not responsive enough. For example, a system with a unique control center in which a control software object determines the transmission rate unique for a certain period of time and then it decides if it is too low or too high. This approach results in a system which could go to the optimal speed in a simulated environment but would not responsive enough in a real network. To address this problem a system of simple transmitters (e.g., gamblers) is created at any given moment with different transmission rates. Each gambler is given a certain time of operation (e.g., a slot). Sending a packet on a network is similar to placing bet (i.e., the packet can arrive at the destination, a win or be dropped for some reason, a loss). The system is able to assign the loss rate to each gambler with a optimized hash map which stores for each packet sent in a generation the id of the sending gambler, so that when the system receives an ACK (acknowledge of the receiver) or a NACK (a loss report which lists the packets missing in the receiver) the system will communicate to each gambler the results of its bets.

When all the gamblers have consumed their associated slot the system ends a generation and the gamblers which have the "greatest score" will be able to "reproduce", and the one with the lowest score will be removed or terminated. The score is computed with a formula which includes the inherent loss of the loss probe packet. A gambler with a high loss could be "better" than a gambler with a low loss if the loss probe is high, that could indicate a lossy network, so that the loss of the gambler is not imputable to its fast transmission but on the characteristics of the network. If, instead, the loss of the probe packets is low a gambler with a high loss rate will have a low score and be terminated.

It is also possible to derive the underlying network's inherent loss rate by measuring the loss rate of the loss probe packets. Once a transmission rate that reduces the packet loss rate is identified, the transmission rate can be increased incrementally until an increase in data loss is observed. Once the increase (i.e., in transmission rate) is observed, it is an indication that the loss rate corresponding to the rate of the transmission immediately before observation of increase in loss rate is the inherent loss rate of the transmission network.

Since the derived inherent network loss rate is the lowest loss rate that can be achieved using the network, the network loss rate can be used as a target loss rate when adjusting the aggressiveness of data transmission. That is, probe packets can be sent to evaluate the loss rate in a given period, and if the loss rate for the probe packets does not exceed the inherent loss rate, it can indicate that data is not being lost due to congestion. Accordingly, transmission throughput is maximized without causing congestion in the network.

FIG. 1 is a block diagram illustrating an example data transmission system 100. Servers (e.g., 102, 104) can be any devices of varying type, capabilities, operating systems configured to transmit and receive data over network (e.g., 106). For example, servers, computing devices, tablets, notebooks, laptops, storage arrays, etc. and as further illustrated in FIGS. 6A and 6B. The network (e.g., 106) can be wide area network, local area network, virtual private cloud, virtual private network, storage area network, or any data transmission network enabled to receive and transmit data between two or more servers. Data packets can be sent from server 102 through a network 106 to server 104 (or vice versa). In some examples data transmission system 100 can include a source server (e.g., 102) can be in signal communication with a device running a web browser and a target server (e.g., 104). The web browser can be used to implement command and instructions to, and receive information from the source server. The source server can include or be coupled to an Apache Web Server. The Apache Web Server can be coupled to a storage unit storing one or more configuration files. The source server can also be at least one storage unit storing keys, which can be public keys or private keys or both. The Apache Web Server can control replication between source server or target server (e.g., 104). In some examples, replication can be bi-directional (e.g., source to target, target to source).

Figure 2:
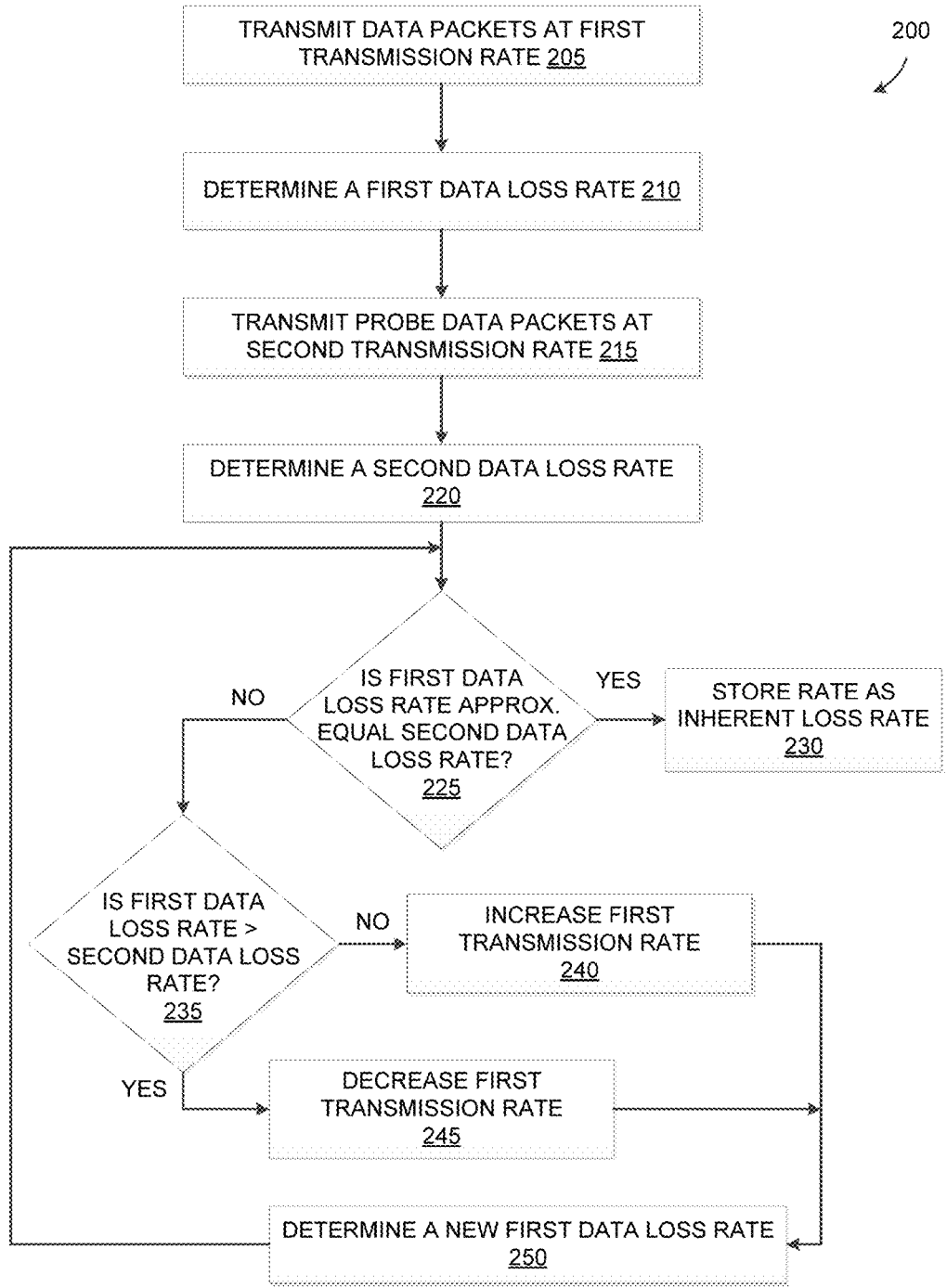
FIG. 2 is a flow diagram illustrating an example method for determining an optimal transmission rate.

FIG. 2 illustrates a flow diagram of an example method for differentiating between data loss caused by properties inherent to the system 100 and/or the network 106 and data loss caused by congestion by the servers (e.g., 102, 104). The method of FIG. 2 is provided by way of example, as there are a variety of ways to carry out the method. Additionally, while the example of method 200 is illustrated with a particular order of blocks, those of ordinary skill in the art will appreciate the method of FIG. 2 and the blocks illustrated therein can be executed in any order that accomplishes the technical advantages of the present disclosure and can include fewer or more blocks than illustrated.

Each block shown in FIG. 2 can represent one or more processes, methods, or subroutines, carried out in example method 200. The blocks illustrated in FIG. 2 can be implemented in the system 100 illustrated in FIG. 1. Each block in FIG. 2 can be carried out by a proxy server, clients, local services, remote servers, or one or more servers (e.g., 102, 104) or systems 100 as illustrated in FIG. 1. Additionally, those of ordinary skill in the art will appreciate that the blocks illustrated in FIG. 2 can included instructions of processes stored in a non-transitory computer readable medium communicatively coupled to a server (e.g., 102, 104), clients, local services, remote servers, or one or more remote servers (not shown).

At block 205, data packets are transmitted over a network at a first transmission rate. For example, a first predetermined transmission rate. In some examples, the first transmission rate can be set by an administrator. In other examples, the first transmission rate can be chosen at random (e.g., 100 μs, which corresponds to approximately 100 Mbps—when the packet size is approximately 1.4 Kb). For example, 100 μs can be converted to Mbps based on an assumption that every packet is approximately 1400 bytes in size (the maximum normal size of a TCP packet is 1500 bytes, approximately 40 bytes of headers). Accordingly, when the packets are separated by 100 μs, 10,000 packets are transmitted per second, which is approximately 14 Mbs, which are 100 Mbit. In other examples, the first transmission rate can be chosen based on previous estimates or transmission rates used at similar specifications (e.g., time, size, length, etc.).

At block 210, a first data loss rate can be determined. For example, the first data loss rate can be determined based on a number of packets lost during a first transmission rate. In some examples, the first data loss rate can correspond to the first transmission rate of 205

At block 215, a probe data packet can be sent at a second transmission rate. For example, a statistically significant number of loss probe data packets are transmitted over the network (e.g., 106) at a second transmission rate. The second transmission rate can be different than the first transmission rate. In some examples, the second transmission rate can be predetermined. In some examples, the second transmission rate can be less than the first transmission rate. In other examples, the second transmission rate can be greater than the second transmission rate.

At block 220, a second data loss rate can be determined. In some examples, the second data loss rate can corresponds to the second transmission rate of 215. In some examples, the second data loss rate can be determined based on a number of packets lost during the second transmission rate.

At block 225, the second data loss rate is compared with the first data loss rate. For example, a determination is mater as to whether the first data loss rate is approximately equal to the second transmission rate. In the event the first data rate is approximately equal the second data rate the method can proceed to block 230. At block 230, the first data rate (or second data rate) is stored as the inherent loss rate of the network (e.g., 106). In event the first data loss rate is lower or higher than second data loss rate, the method can proceed to block 235.

At block 235, a determination is made as to whether the first data loss rate is greater than the second data loss rate. When the first data loss rate is not greater than (i.e., less than) the second data loss rate, the method can proceed to block 240. When the first data loss rate is greater than the second data loss rate, the method can proceed to block 245. In other examples, a determination can be made as to whether the first data loss is less than the second data loss rate (or any combination thereof where the method can proceed to the correct block based on the values of the first data lost rate and second data loss rate).

At block 240, the first transmission rate can be increased. For example, the first transmission rate can be increased by (or to) predetermined amount. In some examples, the predetermined amount can be set by an administrator. In other examples, the predetermined amount can be determined based on the difference between the first data transmission rate and the second data transmission rate. In other examples, the predetermined amount can be an incremental amount based on the first transmission rate (or the inherent network loss rate).

At block 245, the first transmission rate can be decreased. For example, the first transmission rate can be decreased predetermined amount. In some examples, the predetermined amount can be set by an administrator. In other examples, the predetermined amount can be determined based on the difference between the first data transmission rate and the second data transmission rate. In other examples, the predetermined amount can be an incremental amount based on the first transmission rate (or the inherent network loss rate).

At block 250, a new first data loss rate can be determined. For example, the new first data loss rate can be determined based on a number of packets lost during the increased (or decreased) first transmission rate. In some examples, the new first data loss rate can correspond to the new first transmission rate of 240 or 245. When the new first data loss rate is determined, the method can return to block 225.

The method 200 can be repeated under the first data loss rate (or new first data loss rate) is approximately equal to the second data loss rate. As such, the first transmission rate is incrementally increased or decreased until approximately equal the second data loss rate.

Figure 3:
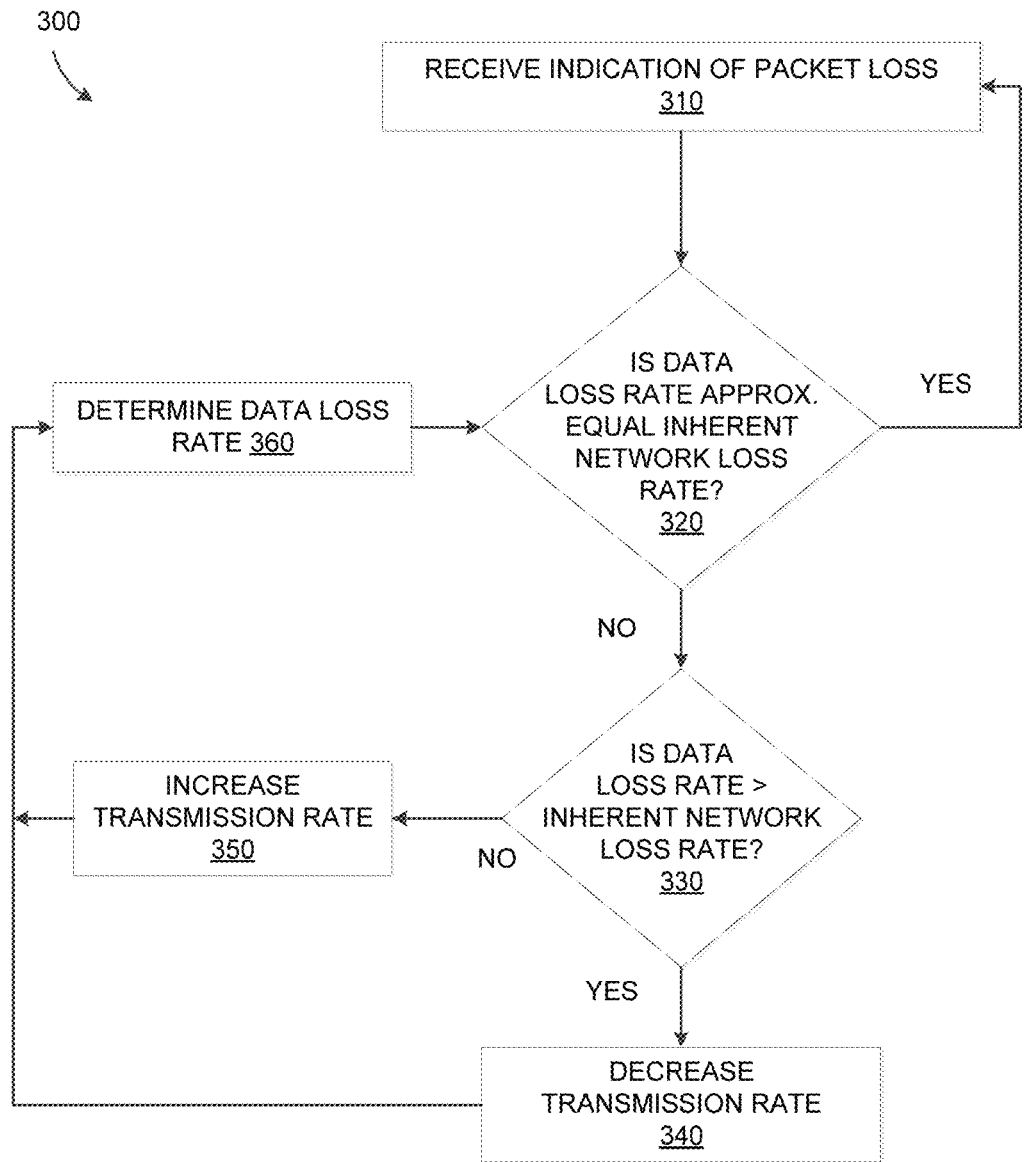
FIG. 3 is a flow diagram illustrating another example method for determining an optimal transmission rate.

FIG. 3 illustrates a flow diagram of a method for differentiating between data loss caused by properties inherent to the system 100 and/or the network 106 and data loss caused by congestion by the server (e.g., 102, 104). The method of FIG. 3 is provided by way of example, as there are a variety of ways to carry out the method. Additionally, while the example of method 300 is illustrated with a particular order of blocks, those of ordinary skill in the art will appreciate the method of FIG. 3 and the blocks illustrated therein can be executed in any order that accomplishes the technical advantages of the present disclosure and can include fewer or more blocks than illustrated.

Each block shown in FIG. 3 can represent one or more processes, methods, or subroutines, carried out in example method 300. The blocks illustrated in FIG. 3 can be implemented in the system 100 illustrated in FIG. 1. Each block in FIG. 3 can be carried out by a proxy server, clients, local services, remote servers, or one or more servers (e.g., 102, 104) or systems 100 as illustrated in FIG. 1. Additionally, those of ordinary skill in the art will appreciate that the blocks illustrated in FIG. 3 can included instructions of processes stored in a non-transitory computer readable medium communicatively coupled to a server (e.g., 102, 104), clients, local services, remote servers, or one or more remote servers (not shown).

Method 300 can begin at block 310. At block 310, a server can receive an indication of packet loss. For example, a server (e.g., 102, 104) can receive an indication that a number of packets sent during a time period were unsuccessfully transmitted. In some examples, the server can received an indication that the loss of packets during a predetermined time period is greater than a threshold amount. In other examples, the server can receive an indication that loss of packets during a predetermined time period is less than a threshold amount.

At block 320, a data loss rate (of the packets) is compared with the inherent network loss rate. For example, a determination of whether the data loss rate is approximately equal to the inherent network loss rate. The inherent network loss rate can be the expected amount of the packet loss operating at an optimal transmission rate (i.e., the transmission rate is not a relevant factor in the packet loss). In the event the data loss rate is approximately equal the inherent network loss rate the method can proceed back to block 310 (at a predetermined interval). For example, to determine the transmission rate of packets is optimal over a period of time.

In the event the data loss rate is not approximately equal the inherent network loss rate the method can proceed to block 330.

At block 330, a determination made as to whether the data loss rate is greater than the inherent network loss rate. When the data loss rate is greater than the inherent network loss rate, the method can proceed to block 340. When the data loss rate is not greater than (i.e., less than) the inherent network loss rate, the method can proceed to block 350. In other examples, a determination can be made as to whether the first data loss is less than the second data loss rate (or any combination thereof where the method can proceed to the correct block based on the values of the data lost rate).

At block 340, the transmission rate can be decreased. For example, the transmission rate can be decreased by (or to) a predetermined amount. In some examples, the predetermined amount can be set by an administrator. In some examples, the predetermined amount can be determined based on the different between the data transmission rate and the inherent network loss rate. In other examples, the predetermined amount can be an incremental amount based on the transmission rate.

At block 350, the transmission rate can be increased. For example, the transmission rate can be increased by (or to) a predetermined amount. In some embodiments, the predetermined amount can be set by an administrator. In some examples, the predetermined amount can be determined based on the different between the data transmission rate and the inherent network loss rate. In other examples, the predetermined amount can be an incremental amount based on the transmission rate.

At block 360, a data loss rate can be determined. For example, the data loss rate can be determined based on a number of packets lost during the increased (or decreased) transmission rate (from blocks 340 or 350). In some examples, the data loss rate can correspond to the new transmission rate (from blocks 340 or 350). When the data loss rate is determined, the method can proceed back to block 320.

The method 300 can be repeated until the data loss rate is approximately equal to the inherent network loss rate. As such, the transmission rate is incrementally increased or decreased until approximately equal the inherent network loss rate.

Figure 4:
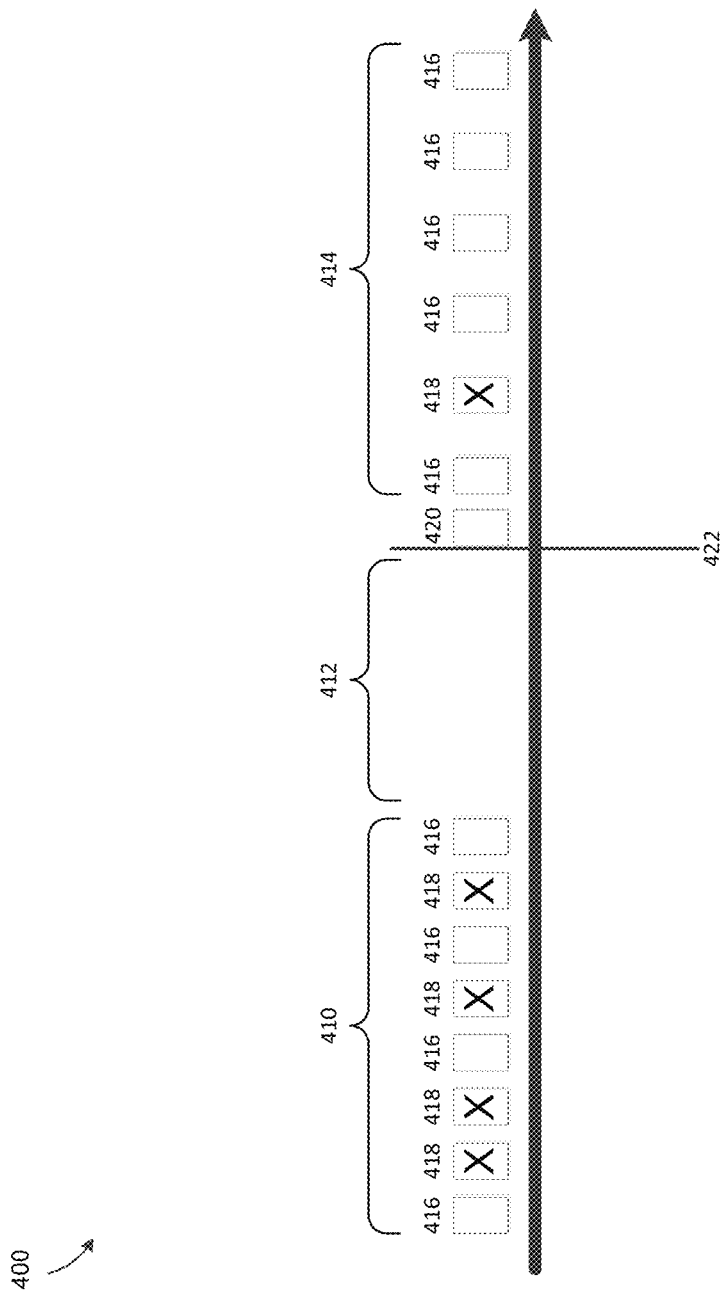
FIG. 4 is a block diagram illustrating example gambler strategies.

FIG. 4 is a block diagram illustrating an example gambler strategy 400 to determine an optimal transmission rate over a network. Gambler strategy 400 illustrates two gamblers (e.g., 410, 414) of a plurality of gamblers. Each gambler (e.g., 410, 414) can transmit packets at different rates. The rates can be randomly selected or can be based on heuristic techniques. In some examples, the rates for gamblers can be determined before the gamblers have started transmission. In other examples, the rates of the gamblers can be determined on-demand or after the first gambler has begun transmission.

Based on the determined rate, each gambler (e.g., 410, 414) can transmit a plurality of packets (416, 418). Packets 416 can represent packets that were successfully transmitted, and packets 418 can represent packets that were not successfully transmitted (e.g., lost, not yet received, etc.). Gambler 410 illustrates a strategy of fast transmission of packets (e.g., small wait time between transmission). As such, gambler 410 will transmit more packets during a predetermined time than gamblers with slower transmission times (e.g., 414). As shown in FIG. 4, gambler 410 pays a higher price (e.g., more packet loss) than gambler 414 for the faster transmission rate. The different patterns of gain-loss (e.g., packet loss verse transmission rate) can be apparent from loss reports generated by the receiver (i.e., of the packets).

FIG. 4 also demonstrates a wait time 412 between gamblers. The wait time enables the network to discharge possible congestion (i.e., created by previous gambler) so the next gambler to operate can be run under similar conditions to the previous gamblers. The wait time 412 also enables probe packet 420 sent at time 422 (e.g., end of wait time) to estimate the "loss zero" (i.e., the intrinsic loss of the network). This assumption can be made because the network is assumed to be returned to the "resting" behavior at time 422.

An example gambler strategy 400 can also determine merits of each gambler based on the generated lost reports and/or loss zero. In some examples, the merits can be determined when all the gamblers have completed. In other examples, the merits can be determined after completion of one or more gamblers of the strategy (e.g., after each gambler, after a specific number of gamblers, after a predetermined number of gamblers, etc.). In response to determining the merits, the subsequent gambler strategies can take into consideration the determined merits in selecting gamblers for execution.

In determining the merits of a gambler, a server can determine a win rate. The win rate can be a ratio between the packets which have been successfully transmitted (i.e., received at the destination) and the total packets sent by the gambler. As such, this ratio can inherently not be greater than 1. The win rate can then be adjusted using the loss zero of the network. In some examples, the adjusted win rate can be calculated by taking the minimum of "1.0" or the win rate added to the loss zero of the network. The merit can then be calculated using the adjusted win rate and the total trades performed by the gambler(s). A trade can be pairing the act of transmitting a packet and the result of the transmission (e.g., either a "win"—the packet is arrived at destination or a "loss"—the packet did not arrive at the destination). In some examples, the merit of a gambler can then be calculated using the Equation (1).

$$\text{merit} = \text{pow}(\text{adjusted win rate}, 10) * \text{pow}(\text{total trades}, 0.33) \qquad \text{Equation (1)}.$$

In this example, the adjusted rate is penalized by a power of 10 (e.g., penalizing quick win rates that are less than 1.0). The cubic root of the total trades can provide a slight advantage to more risk tolerate gamblers. In other examples, these values (e.g., 10, 0.33) can be altered as required (or specified) by a network (e.g., specific performance criteria, methodologies, guidelines, etc.).

Example gambler strategy 400 can also automatically adjust for the loss report cycle. Determining the merit of a gambler is based on the loss report. The determination of the merit can be influenced based on the intervals in which the loss reports are received at the server. For example, a loss report that is received after the merit has been calculated would not be considered during the determination (of the merit) and a loss report that is received before the gambler has finished transmitting packets can count packets which are still in transit as lost (e.g., rendering the loss report unreliable). Gambler strategy 400 (e.g., via the server sending the loss reports and receiving the packets from the gamblers) can mitigate the effects of the intervals in which loss reports are received by tracking wasted packets (e.g., a packet that has been transmitted and counted as lost—for which at least a loss report has been sent—and that packet is received twice or more).

In some examples, the destination of the packets transmitted from the server running the gamblers can track the wasted packets. The destination can track a packet as wasted because, the destination tracks the sent loss reports and the gaps that are created by the lost packets. The destination can automatically adjust the rhythm (e.g., the interval at which the loss reports are sent from the destination to the server) of the loss reports by minimizing the number of wasted packets. The automatic adjustments made to the loss reports can then be transmitted to server running the gamblers for consideration in determining the merit. In some examples, the destination can also automatically adjust the number of packets required for each generated loss report. For example, the destination can attempt to fill the channel (e.g., transmitting a loss report at multiples of the round-trip delay time, each loss report containing the request to resend packets) using Equation (2).

$$\text{Bandwith-delay product} = \text{bandwidth} * \text{delay} \qquad \text{Equation (2)}.$$

Figure 5:
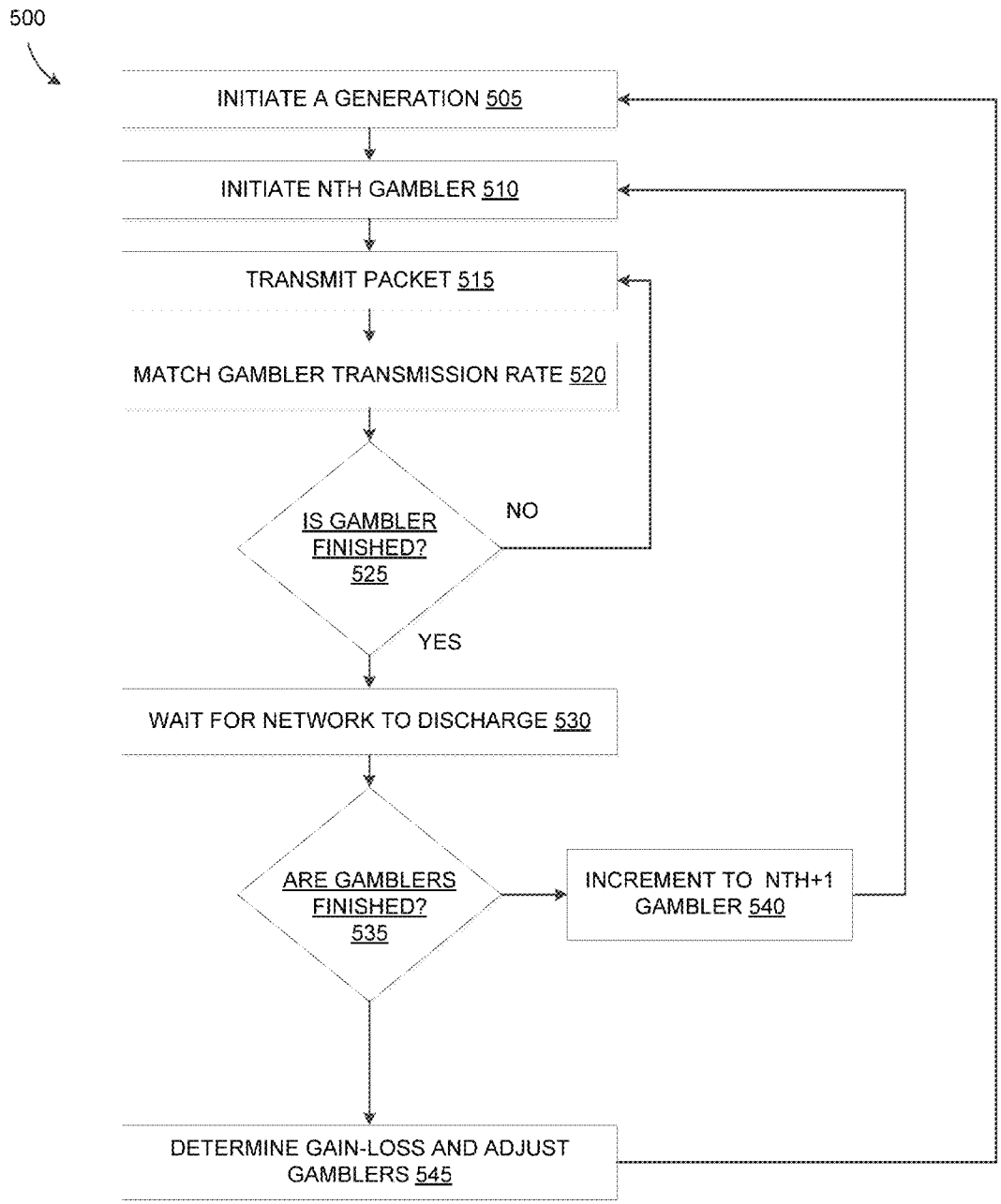
FIG. 5 is a flow diagram illustrating an example method for determining an optimal transmission rate using gambler strategies.

FIG. 5 illustrates a flow diagram of a method for determining an optimal transmission rate over a network. The method of FIG. 5 is provided by way of example, as there are a variety of ways to carry out the method. Additionally, while the example of method 500 is illustrated with a particular order of blocks, those of ordinary skill in the art will appreciate the method of FIG. 5 and the blocks illustrated therein can be executed in any order that accomplishes the technical advantages of the present disclosure and can include fewer or more blocks than illustrated.

Each block shown in FIG. 5 can represent one or more processes, methods, or subroutines, carried out in example method 500. The blocks illustrated in FIG. 5 can be implemented in the system 100 illustrated in FIG. 1 and gamblers illustrated in FIG. 4. Each block in FIG. 5 can be carried out by a proxy server, clients, local services, remote servers, or one or more servers (e.g., 102, 104) or systems 100 as illustrated in FIG. 1. Additionally, those of ordinary skill in the art will appreciate that the blocks illustrated in FIG. 5 can included instructions of processes stored in a non-transitory computer readable medium communicatively coupled to a server (e.g., 102, 104), clients, local services, remote servers, or one or more remote servers (not shown).

Method 500 can begin at block 505. At block 505, a generation (e.g., gambler strategy) can be initiated on a server (e.g., 102, 104). For example, a generation can be initiated at a specific or predetermined time. The generation can have a specific or predetermined number of gamblers.

At block 510, an nth gambler can be initiated. The nth gambler can be the first gambler of the plurality of gamblers of the generation to be initiated. At block 515, the nth gambler (i.e., running on the server) can transmit a packet(s). At block 520, the server can match the nth gambler transmission rate for the transmission of the packet (i.e., at block 515). After, the nth gambler (i.e., running on the server) has transmitted the packet at the nth gambler transmission rate, the method can determine at block 525, whether the gambler has finished (i.e., transmitting packets). When the gambler has not finished transmitting packets, method 500 can return to block 515 (i.e., to transmit another packet). When the gambler has finished transmitting packets, method 500 can proceed to block 530.

At block 530, the server can wait for the network to discharged (e.g., 412). The server can also send a probe packet (e.g., 420) at the end of the wait period (e.g., 422) to determine the inherent loss of the network. When the wait period has expired a probe packet can be transmitted to determine the data loss inherent in the network.

At block 535, a determination is made as to whether the plurality of gamblers are finished. If the plurality of gamblers are not finished (i.e., there are one or more gamblers to initiate) method 500 can proceed to block 540. If the plurality of gamblers are finished, method 500 can proceed to block 545.

At block 540, the nth gambler can be incremented to the nth+1 gambler and the method can proceed to block 510 where the nth+1 gambler can be initiated. The nth+1 gambler can be the next gambler (following the nth gambler) of the plurality of gamblers to be initiated. This process can continue until the gamblers in the plurality of gamblers of the generation have been initiated and completed.

At block 545, the gain-loss can be determined and the gamblers can be adjusted for the next generation. For example, the server can receive a lost report for the gamblers. The lost report can provide information on packets transmitted, success of the transmission, etc. The server can determined, based on the lost report the gain-loss of the gamblers (transmission rates v. packet loss). Based on the gain-loss, the gamblers can be adjusted for the next generation. For example, adjustments can be removing the gamblers which have a significant lower success rate and creating new gamblers with a transmission rate which are closer to the inherent network lost rate. If during the current generation (e.g., block 505) the server has not received a threshold number of loss reports, no adjustments are made the gamblers. After the adjustments have been made to the gamblers, method 500 can proceed to block 505 for the next generation.

Figure 6A:
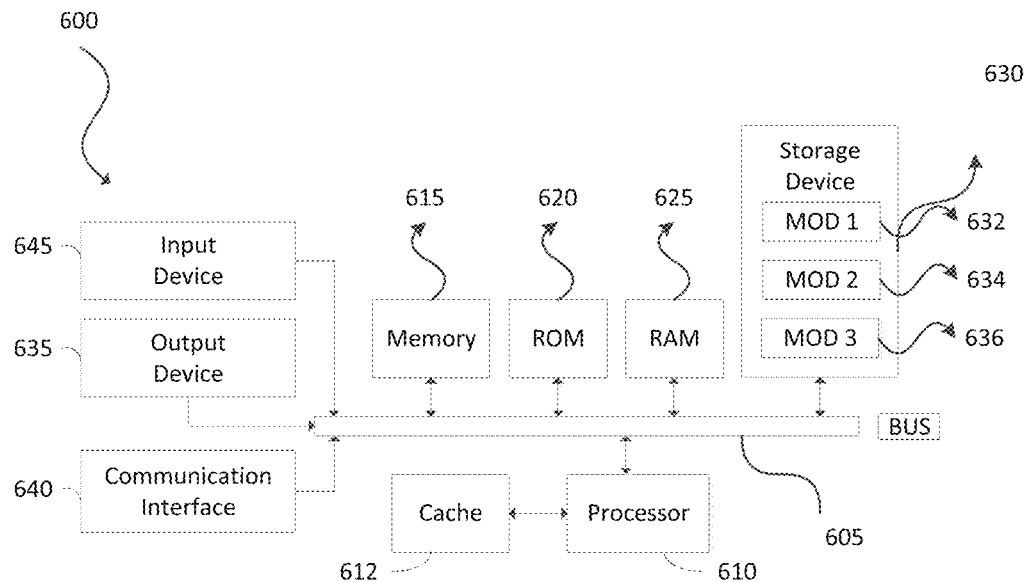
FIG. 6A shows an exemplary possible system example for implementing various examples of the present technology.
Figure 6B:
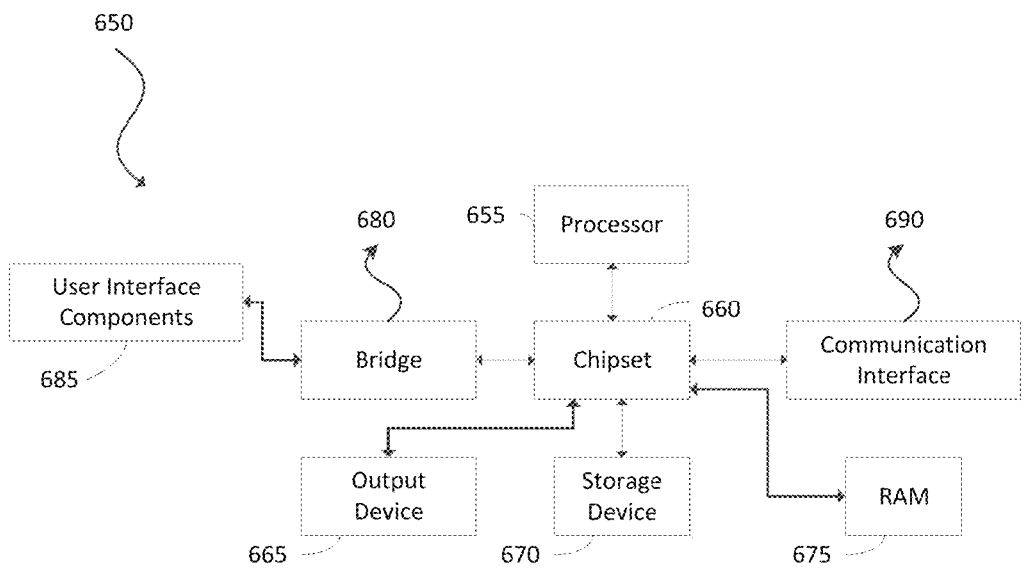
FIG. 6B shows an exemplary possible system example for implementing various examples of the present technology.

FIG. 6A and FIG. 6B show exemplary possible system examples. The more appropriate example will be apparent to those of ordinary skill in the art when practicing the present technology. Persons of ordinary skill in the art will also readily appreciate that other system examples are possible.

FIG. 6A illustrates a conventional system bus computing system architecture 600 wherein the components of the system are in electrical communication with each other using a bus 60. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, blocks or routines in a method embodied in software, or combinations of hardware and software.

Any of the blocks, operations, functions, or processes described herein may be performed or implemented by a combination of hardware and software modules, alone or in combination with other devices. In an example, a software module can be software that resides in memory of a client device and/or one or more servers of a content management system and perform one or more functions when a processor executes the software associated with the module. The memory can be a non-transitory computer-readable medium.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method blocks, it is to be understood that the subject matter defined in the appended claims is not necessarily limited to these described features or acts. For example, such func-

I claim:

1. A system for minimizing data loss in a network, the system comprising:
   a processor; and
   a memory storing instructions, which when executed by the processor causes the processor to:
      initiate a generation of a plurality of gamblers, wherein each gambler of the plurality of gamblers has a different transmission rate;
      for each gambler of the plurality of gamblers of the generation:
         transmit, over a network, one or more packets at a transmission rate associated with the gambler; and
         in response to a determination the gambler is finished, wait for the network to discharge and initiating a next gambler of the plurality of gamblers; and
      in response to a determination the generation is finished, determine a gain-loss of the generation and adjusting the plurality of gamblers.

2. The system of claim 1, wherein the gain-loss of the generation includes a comparison of different transmission rates and associated packet loss of each gambler of the plurality of gamblers.

3. The system of claim 1, wherein the gain-loss of the generation comprising further instructions which when executed by the processor, causes the processor to:
   determine a merit for each of the gamblers of the generation based on one or more received loss reports; and
   automatically adjust the plurality of gamblers based on the merits of the plurality of gamblers.

4. The system of claim 3, wherein the merits for each of the gamblers comprising further instructions which when executed by the processor, causes the processor to:
   determine a win rate, wherein the win rate is a ratio between successfully transmitted packets for the gambler and total packets sent by the gambler;
   adjust the win rate using a loss zero of the network; and
   determine the merit of the gambler using the adjusted win rate and total trades of the gambler, wherein the total trades are a pairing of transmitting a packet and results of the transmission.

5. The system of claim 4, wherein $$merit = adjusted\ win\ rate^{10} * total\ trades^{0.33}.$$

6. The system of claim 1, wherein adjusting the plurality of gamblers comprising further instructions which when executed by the processor, causes the processor to:
   remove one or more gamblers of the plurality of gamblers with a higher packet loss rate according to the gain-loss of the generation; and
   create one or more gamblers with a transmission rate within a predetermined amount of an inherent network loss rate.

7. The system of claim 6, wherein the inherent network loss rate is determined by transmitting a probe loss packet after the network is discharged.

8. A method for minimizing data loss in a network, the method comprising:
   initiating a generation of a plurality of gamblers, wherein each gambler of the plurality of gamblers has a different transmission rate;
   for each gambler of the plurality of gamblers of the generation:
      transmitting, over a network, one or more packets at a transmission rate associated with the gambler; and
      in response to a determination the gambler is finished, waiting for the network to discharge and initiating a next gambler of the plurality of gamblers;
   in response to a determination the generation is finished, determining a gain-loss of the generation and adjusting the plurality of gamblers.

9. The method of claim 1, wherein the gain-loss of the generation includes a comparison of different transmission rates and associated packet loss of each gambler of the plurality of gamblers.

10. The method of claim 1, wherein the gain-loss of the generation further comprising:
    determining a merit for each of the gamblers of the generation based on one or more received loss reports; and
    automatically adjusting the plurality of gamblers based on the merits of the plurality of gamblers.

11. The method of claim 10, wherein the merits for each of the gamblers further comprising:
    determining a win rate, wherein the win rate is a ratio between successfully transmitted packets for the gambler and total packets sent by the gambler;
    adjusting the win rate using a loss zero of the network; and
    determining the merit of the gambler using the adjusted win rate and total trades of the gambler, wherein the total trades are a pairing of transmitting a packet and results of the transmission.

12. The method of claim 11, wherein $$merit = adjusted\ win\ rate^{10} * total\ trades^{0.33}.$$

13. The method of claim 1, wherein adjusting the plurality of gamblers further comprising:
    removing one or more gamblers of the plurality of gamblers with a higher packet loss rate according to the gain-loss of the generation; and
    creating one or more gamblers with a transmission rate within a predetermined amount of an inherent network loss rate.

14. The method of claim 13, wherein the inherent network loss rate is determined by transmitting a probe loss packet after the network is discharged.

15. A non-transitory computer readable medium storing instructions, which when executed by a processor causes the processor to:
    initiate a generation of a plurality of gamblers, wherein each gambler of the plurality of gamblers has a different transmission rate;
    for each gambler of the plurality of gamblers of the generation:
       transmit, over a network, one or more packets at a transmission rate associated with the gambler; and
       in response to a determination the gambler is finished, wait for the network to discharge and initiating a next gambler of the plurality of gamblers; and
    in response to a determination the generation is finished, determine a gain-loss of the generation and adjusting the plurality of gamblers.

16. The non-transitory computer readable medium of claim 1, wherein the gain-loss of the generation includes a comparison of different transmission rates and associated packet loss of each gambler of the plurality of gamblers.

17. The non-transitory computer readable medium of claim 1, wherein the gain-loss of the generation comprising further instructions which when executed by the processor, causes the processor to:
  determine a merit for each of the gamblers of the generation based on one or more received loss reports; and
  automatically adjust the plurality of gamblers based on the merits of the plurality of gamblers.

18. The non-transitory computer readable medium of claim 17, wherein the merits for each of the gamblers comprising further instructions which when executed by the processor, causes the processor to:
  determine a win rate, wherein the win rate is a ratio between successfully transmitted packets for the gambler and total packets sent by the gambler;
  adjust the win rate using a loss zero of the network; and
  determine the merit of the gambler using the adjusted win rate and total trades of the gambler, wherein the total trades are a pairing of transmitting a packet and results of the transmission.

19. The non-transitory computer readable medium of claim 18, wherein $$\text{merit} = \text{adjusted win rate}^{10} * \text{total trades}^{0.33}.$$

20. The non-transitory computer readable medium of claim 1, wherein adjusting the plurality of gamblers comprising further instructions which when executed by the processor, causes the processor to:
  remove one or more gamblers of the plurality of gamblers with a higher packet loss rate according to the gain-loss of the generation; and
  create one or more gamblers with a transmission rate within a predetermined amount of an inherent network loss rate.

21. The non-transitory computer readable medium of claim 20, wherein the inherent network loss rate is determined by transmitting a probe loss packet after the network is discharged.

* * * * *